US006947963B1

(12) United States Patent
Agarwal et al.

(10) Patent No.: US 6,947,963 B1
(45) Date of Patent: Sep. 20, 2005

(54) METHODS AND APPARATUS FOR SYNCHRONIZING AND PROPAGATING DISTRIBUTED ROUTING DATABASES

(75) Inventors: Puneet Agarwal, San Francisco, CA (US); Russell R. Tuck, III, San Jose, CA (US); Bora Aydin Akyol, San Jose, CA (US); Erol Basturk, Cupertino, CA (US); Mike Mussoline, Sunnyvale, CA (US)

(73) Assignee: Pluris, Inc, Cupertino, CA (US)

( * ) Notice: Subject to any disclaimer, the term of this patent is extended or adjusted under 35 U.S.C. 154(b) by 600 days.

(21) Appl. No.: 09/606,377

(22) Filed: Jun. 28, 2000

(51) Int. Cl.[7] ............................................. G06F 15/16
(52) U.S. Cl. ..................... 709/201; 709/239; 709/240; 709/242; 709/243; 709/248
(58) Field of Search .............................. 709/201, 203, 709/105, 236, 238–242, 248; 707/203, 10, 707/351; 370/351

(56) References Cited

U.S. PATENT DOCUMENTS

| | | | | |
|---|---|---|---|---|
| 5,765,171 A | * | 6/1998 | Gehani et al. | 707/203 |
| 5,771,353 A | * | 6/1998 | Eggleston et al. | 709/227 |
| 5,905,723 A | * | 5/1999 | Varghese et al. | 370/351 |
| 6,205,146 B1 | * | 3/2001 | Rochberger et al. | 370/395.53 |
| 6,208,952 B1 | * | 3/2001 | Goertzel et al. | 709/230 |
| 6,212,521 B1 | * | 4/2001 | Minami et al. | 707/10 |
| 6,223,187 B1 | * | 4/2001 | Boothby et al. | 707/201 |
| 6,272,522 B1 | * | 8/2001 | Lin et al. | 709/200 |
| 6,338,092 B1 | * | 1/2002 | Chao et al. | 709/236 |
| 6,466,988 B1 | * | 10/2002 | Sukegawa et al. | 709/248 |
| 6,539,381 B1 | * | 3/2003 | Prasad et al. | 707/10 |
| 6,735,198 B1 | * | 5/2004 | Edsall et al. | 370/389 |
| 6,757,289 B1 | * | 6/2004 | Cain et al. | 370/401 |
| 6,775,706 B1 | * | 8/2004 | Fukumoto et al. | 709/230 |

* cited by examiner

Primary Examiner—Ario Erienne
Assistant Examiner—Oanh L. Duong
(74) Attorney, Agent, or Firm—Donald R. Boys; Central Coast Patent Agency, Inc.

(57) ABSTRACT

A method of and apparatus for distributing data for a database between a plurality of processors in a distributed processor system involves running a database management system on a first plurality of processors in conjunction with a plurality of protocols that generate or amend data for the database. Data is distributed from servers to clients registered in a server-client relationship. Server-client relationships may also be registered between a second, and a third plurality of processors that do not run protocols generating or amending data for the database. Fault tolerant redundancy is provided by clients registering with two or more servers, one as a primary and another as a secondary, and activating the secondary if the primary fails. The method is particularly applicable to scalable data packet routers having a plurality of processors operating on different line and control cards.

24 Claims, 10 Drawing Sheets

METHODS AND APPARATUS FOR SYNCHRONIZING AND PROPAGATING DISTRIBUTED ROUTING DATABASES

BACKGROUND OF THE INVENTION

1. Field of the Invention

The present invention relates to methods and apparatus for synchronizing and propagating distributed routing databases. The invention also relates to methods for distributing routing data within a distributed processor router system.

2. Background of the Related Art

In the context of internetworking, routing is the coordinated transfer of information from a source to a destination via hardware known as a router. Routing occurs at Layer 3, the network layer, of the OSI reference model of the ISO (International Society for Standardization). The OSI reference model is a conceptual model composed of seven layers, each specifying particular network functions. The two lowest layers (layers 1 and 2) of the OSI model, namely the physical and data link layers, are implemented in both hardware and software. Layer 3 and layers upwards therefrom are generally implemented only in software.

Using terminology of the International Organization for Standardization (ISO), network devices may be classified as follows. Those devices with the capability to forward packets between subnetworks are referred to as intermediate systems (ISs). (In contrast, network devices without such capabilities are called end systems). Intermediate systems may be classified as intradomain ISs, i.e., those which can communicate within routing domains, and interdomain ISs which can communicate both within and between routing domains. A routing domain, or autonomous system, can be considered to be a part of an internetwork which is regulated under common administrative authority.

A key component of routing is determination of optimal routing paths for data packets. Thereafter a second component, which may be referred to as "forwarding", comprises transporting packets through the internetwork. Determination of optimal routing paths relies on one or more routing protocols to provide and update a routing database for each router in a network. Depending on the particular routing protocol(s) used, various metrics are involved in building the routing database. Metrics that may be used by various routing protocols, either singly or as components of hybrid metrics, include: bandwidth, cost, path length, reliability, and load. Such metrics are well known in the art.

Routing protocols are used to determine best routes for transporting packets through an internetwork. Routing in a network can be classified as either dynamic or static. Static routing is accomplished by using table mappings which are entered by a user (e.g. network administrator) prior to routing, and are only changed by user input. Dynamic routing is accomplished by routing protocols that adjust to changing network conditions in response to incoming route update information. As a result, routes are recalculated, new routing update messages are sent out to peer routers, and updated routing databases are constructed. Routing protocols may be interior or exterior. Conventionally, interior routing protocols are used for determining routes within a routing domain. Examples of interior routing protocols are Routing Information Protocol (RIP) and Open Shortest Path First (OSPF). Exterior routing protocols exchange routing information between routing domains. Examples of exterior routing protocols are Border Gateway Protocol (BGP) and Exterior Gateway Protocol (EGP).

OSPF is a unicast routing protocol that requires each router in a network to be aware of all available links in the network. OSPF calculates routes from each router running the protocol to all possible destinations in the network. Intermediate System to Intermediate System (IS-IS) is an OSI link-state hierarchical routing protocol based on DECnet Phase V routing, whereby ISs (routers) exchange routing information based on a single metric, to determine network topology.

BGP performs interdomain routing in TCP/IP networks. As an exterior gateway protocol (EGP), BGP performs routing between multiple routing domains and exchanges routing and reachability information with other BGP systems. Each BGP router maintains a routing database that lists all feasible paths to a particular network. The router does not refresh the routing database, however. Instead, routing information received from peer routers is retained until an incremental update is received. BGP devices exchange routing information upon initial data exchange and after incremental updates. When a router first connects to the network, BGP routers exchange their entire BGP routing tables.

In order to update their routing databases, routers send and receive information regarding network topology. Examples of such information include routing update messages, and link-state advertisements. By communicating with other routers in this way, each router obtains a routing database that defines the current topology of the network of which it is a part, enabling determination of optimal routing path.

Entries are added to and removed from the route database either by the user (e.g., a network administrator) in the form of static routes, or by various dynamic routing protocol tasks. In dynamic routing, routes are updated by software running in the router. The routing database defines a mapping from destination address to logical (output) interface, enabling the router to forward packets along the best route toward their destination. The route database is also the principal medium used to share routes among multiple active routing protocols. Thus, the routing database comprises an essential entity at the heart of every router.

Typically, two or three routing protocols may be active in any one router. The routing database as such is a superset of the set of routes actually used for forwarding packets. This is due, in part, to the fact that different routing protocols compute their preferred routes independently of each other, based on different metrics. Only when all route entries generated by the full complement of routing protocols are shared in the routing database, or route table, can the best routes be selected. The result of this selection is a subset of the routing database commonly referred to as the forwarding table. The forwarding table can be considered a filtered view of the routing database. The forwarding table is used by all entities of the router that have to forward packets in and out of the router.

In conventional or prior art non-scalable routers, which have a modest number of interfaces, there is a single copy of the routing database shared by all of the routing protocols. In non-scalable routers, the computational power available to the routing protocols is typically limited to a single processor. Also, in non-scalable routers, the number of entities requiring a copy of the forwarding table is relatively small.

In contrast, in routers with a relatively large number of interfaces, a possibility exists for imposing much higher computational loads on the processor, up to a point where it is no longer feasible to run all routing protocols on the same processor. In order to realize improved performance from such routers, the protocol computational load must be distributed onto a plurality of processors. Furthermore, in routers with a very large number of interfaces, the number of entities requiring a copy of the forwarding table can be very large, for example, numbering several thousands. This latter situation also imposes higher computational loads and the need for a plurality of processors per router.

However, running the routing protocols on a plurality of processors, each processor having a copy of the routing database, introduces a potential problem into the routing system. The problem is the critical requirement to keep all copies of the routing database consistent. This requirement is critical because the view of the routing database presented to the routing protocols is vital to correct routing. Moreover, the ability to provide an accurate and timely copy of the forwarding table to a very large number of entities in the system is necessary in order to leverage the benefits provided by a distributed routing database environment.

The instant invention provides a method for the distribution and synchronization of the routing database and forwarding table to a large number of entities within a distributed processor environment of a scalable router.

SUMMARY OF THE INVENTION

According to one aspect of the invention, there is provided a method for the synchronized distribution of routing data in a distributed processor router. The invention allows multiple routing databases, formed by distributed routing protocols, to be synchronized. The invention further allows distributed propagation of the synchronized database.

One feature of the invention is that it enables the scaling of routing protocol tasks instantiated on multiple processors. Another feature of the invention is that it provides a distributed processor router environment, in which a plurality of processors host at least one of a plurality of different routing protocols. Another feature of the invention is that it provides a route table manager for controlling the propagation of a synchronized routing database within a distributed processor environment.

One advantage of the invention is that it allows routing databases to be constructed and propagated in a distributed manner by instantiating routing protocol tasks on multiple processors. Another advantage of the invention is that it provides a method for exchanging route data between a plurality of processors within a distributed processor router environment, wherein the exchange of route data is controlled by a route table manager (RTM). Another advantage of the invention is that it provides a method for registering a first RTM task as a client of a second RTM task in order to establish a first RTM task-second RTM task client-server relationship, wherein the first RTM task and the second RTM task occupy either the same hierarchical level or different hierarchical levels. Another advantage of the invention is that it provides a method for establishing a first RTM task-second RTM task client-server relationship, wherein the first RTM task is running on a line card of a highly scalable router, and the second RTM task is running on a control card of the same router.

These and other advantages and features are accomplished by the provision of a method of synchronized distribution of routing data in a distributed processor router, including the following steps: a) running zero or more routing protocols of a complement of routing protocols on each of a first plurality of processors, wherein each routing protocol of the complement of routing protocols generates routing data; b) registering each of the first plurality of processors with at least one other of the first plurality of processors; c) exchanging the routing data between members of the first plurality of processors, such that each of the first plurality of processors receives a full complement of routing data generated by the complement of routing protocols, the complement of routing data providing a complete routing database; d) forming a forwarding database from the complete routing database, the forwarding database comprising a subset of the complete routing database; and e) propagating the forwarding database from the first plurality of processors to a second plurality of processors, wherein the second plurality of processors are not running a routing protocol.

These and other advantages and features are accomplished by the provision of a method of distributing routing data in a distributed processor router under the control of a route table manager (RTM), the router running a complement of routing protocols and the router having a plurality of control cards and a plurality of line cards, wherein this method includes: a) running an RTM task on each of the plurality of control cards, and running an RTM task on each of the plurality of line cards; b) generating routing data on at least one of the plurality of control cards; c) under the control of the RTM, distributing at least a portion of the routing data from at least one of the plurality of control cards to at least one other of the plurality of control cards; and d) again under the control of the RTM, distributing at least a portion of the routing data from at least one of the plurality of control cards to at least one of the plurality of line cards.

These and other advantages and features are accomplished by the provision of a method of registering a route table manager (RTM) task client with a RTM task server within a distributed processor router, including the steps of: a) querying, via the RTM, a location service for a first node list, wherein the location service is a directory listing the location and status of each task running within the router, and wherein the first node list comprises a list of prospective RTM task servers; b) sending the first node list from the location service to a would-be RTM task client; c) selecting, by the would-be client, a first node from the first node list; d) sending a registration request from the would-be client to the first node selected in said step c); e) adding the would-be client as a client of the first node selected, whereby the first node selected is a server of the client; and f) after step e), sending a registration response from the server of the client to the client.

These and other advantages and features are accomplished by the provision of a distributed processor router, including: a plurality of control cards, and a plurality of line cards, the plurality of control cards having a first plurality of processors, wherein each of the first plurality of processors runs zero or more routing protocols of a complement of routing protocols, each routing protocol of the complement of routing protocols generates routing data, and each of the first plurality of processors registers with at least one other of the first plurality of processors for exchange of the routing data between members of the first plurality of processors such that each of the first plurality of processors receives a full complement of routing data.

These and other advantages and features of the invention will be set forth in part in the description which follows and in part will become apparent to those having ordinary skill in the art upon examination of the following, or may be learned from practice of the invention. The advantages of the invention may be realized and attained as particularly pointed out in the appended claims.

ACRONYMS

The following acronyms and abbreviations are used in the description which follows:
BGP: Border gateway Protocol
CCB: Client Control Block
IS-IS: Intermediate System to Intermediate System
ITC: Inter task communication
LS: Location Service
OSPF: Open Shortest Path First
RTM: route table manager (also referred to as the global route table manager (GRTM)).

DETAILED DESCRIPTION OF THE PREFERRED EMBODIMENTS

Figure 1A:
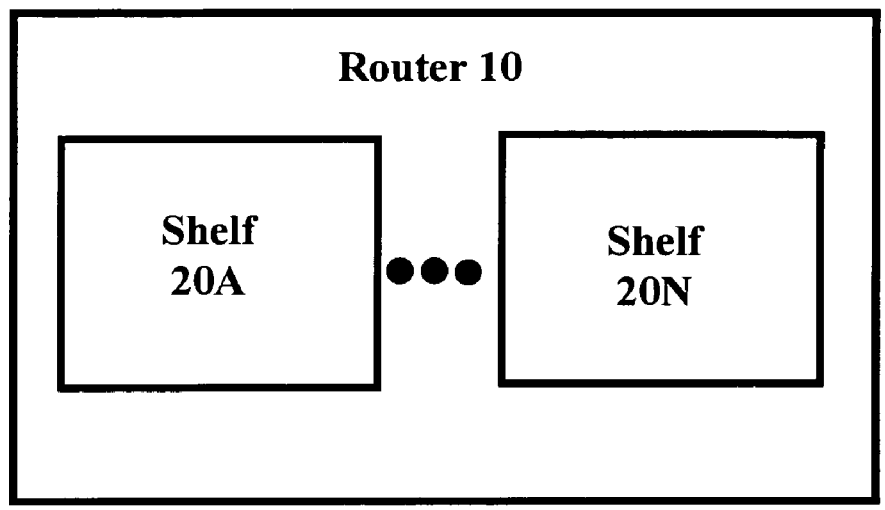
FIGS. 1A, 1B and 1C are block diagrams showing basic architecture of a scalable router according to an embodiment of the invention.
Figure 1B:
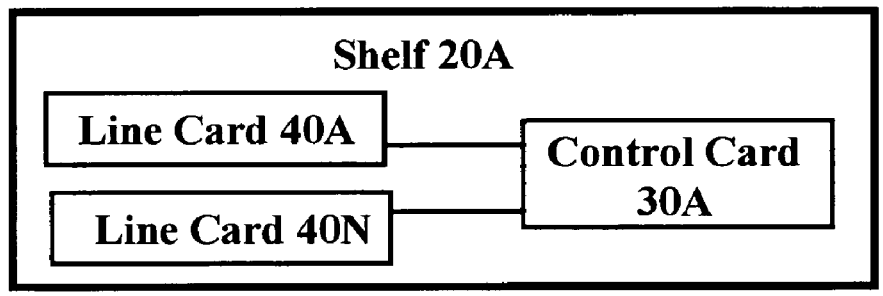
Figure 1B:
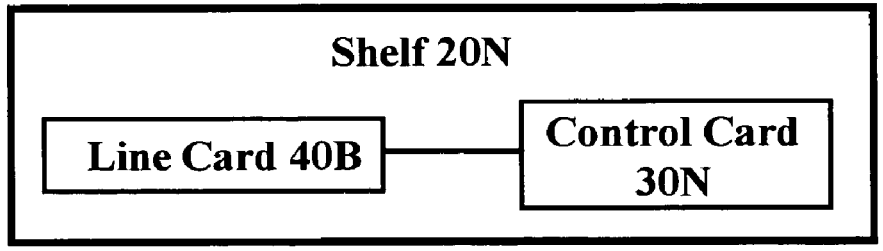
Figure 1C:
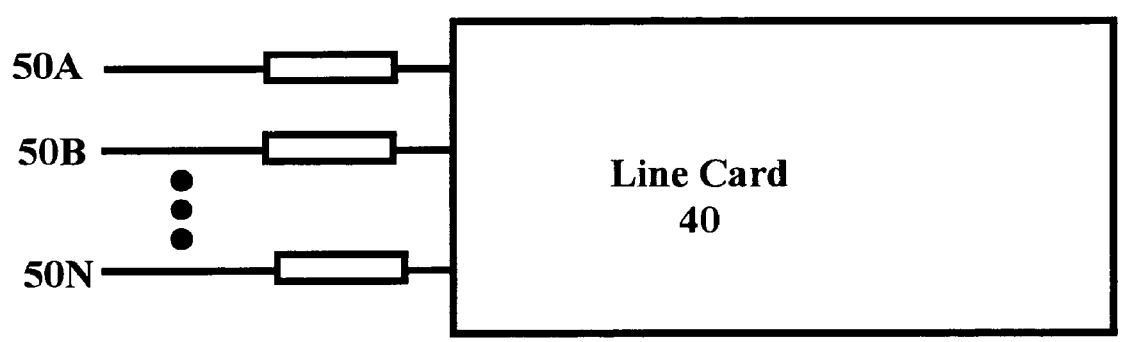

In order to place the invention in perspective for the better understanding thereof, there now follows, with reference to FIGS. 1A–1C, a brief description of a scalable router which may be used in conjunction with the instant invention. FIG. 1A is a block diagram showing the basic architecture of a router 10. Each router 10 may include a plurality of shelves, represented in FIG. 1A as 20A to 20N. As shown in FIG. 1B, each shelf 20 can include a plurality of line cards, represented as 40A to 40N. For the purpose of clarity, only two control cards are shown in FIG. 1B; however, it is to be understood that in practice larger numbers of control cards can be used according to the invention. Each control card 30 is in communication with at least one line card 40. For example, control card 30A is shown as being in communication with line cards 40A and 40N on shelf 20A. Again, for the purpose of clarity, only two line cards are shown as being in communication with control card 30A. However, according to the invention, larger numbers of line cards may be connected to each control card.

FIG. 1C shows line card 40, which could be any of the line cards from a shelf of router 10. Line card 40 has a plurality of ports, or exterior interfaces, 50A, 50B, through 50N connected thereto. Although, only three interfaces are depicted in FIG. 1C, it is to be understood that a much larger number of interfaces may be used in practice.

Introduction to a Route Table Manager

A route table manager (RTM) of the instant invention is a multifaceted software suite having a plurality of functions (tasks) that include, but are not necessarily limited to, the following:

1. messaging between RTM task servers and RTM task clients to form scalable and fault tolerant distribution topologies;
2. managing exchange of database information between RTM tasks running on separate processors within a distributed processor environment;
3. constructing a routing database from the sum of database information a) generated locally by tasks running on a local processor, and b) generated by and received from tasks running on at least one remote processor;
4. constructing a forwarding database from the routing database; and
5. propagating the forwarding database from RTM tasks having a higher hierarchical level (Level-1 tasks) to RTM tasks having a lower hierarchical level (Level-2 and lower-level tasks).

In a distributed multi-processor router, such as is encountered according to certain aspects of the instant invention, the RTM distributes information on dynamic routes, static routes, and interface information, hereafter referred to as database information. In return, RTM relies on a number of tasks (services) for database information updates. Such tasks include those of dynamic routing protocols, IP, and an interface manager task. Routing protocols provide the RTM with updates on dynamic routes. IP tasks provide the RTM with updates on static routes. The interface manager task manages the ports, or external interfaces, of the router system, and provides the RTM with interface information. Interface information relates to a specific interface from which to dispatch a particular packet. Interface information, in general, is well known in the art.

The sum of the database information provided by services is collectively referred to as the routing database. Route entries maintained in the routing database include best and non-best routes. For example, all route entries that were injected by different routing protocols of the system's complement of routing protocols are stored in the routing database. However, for a plurality of entries having the same destination prefix, only one of the entries is deemed the best. The decision as to which of those is the best entry (i.e. the best route for forwarding a packet) is based on a pre-configured preference value assigned to each routing protocol. For example, if static routes have a high preference value and IS-IS routes have a low preference value, and a route entry having the same destination prefix was injected by each protocol, although both entries will remain in the routing database, the static route is considered to be the best route. In embodiments of the invention, both the best routes and the non-best routes, as well as interface information, are retained in the routing database. A subset of the routing database exists which is referred to as the forwarding table. The forwarding table contains all route entries that are deemed the best plus all interface information. Therefore, according to the invention, both the best routes and the interface information define the forwarding table.

A task of the RTM software suite typically runs on each of the plurality of processors of a multi-processor scalable system, including processors on control cards and line cards. The RTM task executing on each processor can be classified as either a Level-1 RTM task (L1) or a Level-2 RTM task (L2), and the processor may be termed an L1 or an L2 as a result. The distinction between an L1 and an L2 is in general the presence of either a routing database or a forwarding table. An L1 RTM task maintains the routing database and an L2 RTM task maintains the forwarding table. A subset of the plurality of processors of the system is statically configured to host an L1 RTM task and is referred to as the L1 pool. All other processors of the system outside of the L1 pool host an L2 RTM task.

As previously described, the RTM depends on a number of services for updates in routing information. A processor within the L1 pool may be running a number of such services, or none at all. Examples of such services include the IP routing protocols, OSPF, BGP, integrated ISIS, etc. (See, for example, C. Huitema, *Routing in the Internet*, $2^{nd}$ Edition, Prentice Hall PTR, 2000.) According to the invention, each L1 is responsible for constructing a routing database from information generated in part by the local service(s), and in part from information generated by services running in association with other L1s. To obtain information that is generated by non-local services, i.e. information generated by services running on other L1s, an L1 must register with at least one other L1 where the service is running. According to the invention, in order to efficiently exchange locally generated information between L1s, each L1 can register with at least one other L1 as needed, on a per-service basis, to receive updates on the full complement of route data which is generated non-locally.

L1s register with each other for distribution of the following types of database information: dynamic routes including best and non-best routes, static routes including best and non-best routes, and interface information. An L1 is classified as an L1 server or L1 client for a given type of database information, depending on the existence of local services. An L1 task is an L1 server for a particular type of database information if the service which generates that information is running locally. An L1 task is an L1 client for a particular type of database information if the service which generates that information is not running locally and the L1 task has registered with an L1 server for information of this type. For example, if a BGP task was running on a given processor, the L1 task on that processor is considered an L1 server for BGP route information. If the same L1 task has registered with a remote L1 task for OSPF route information, the former L1 task is considered an L1 client of the remote L1 task with regard to OSPF route information.

Figure 2:
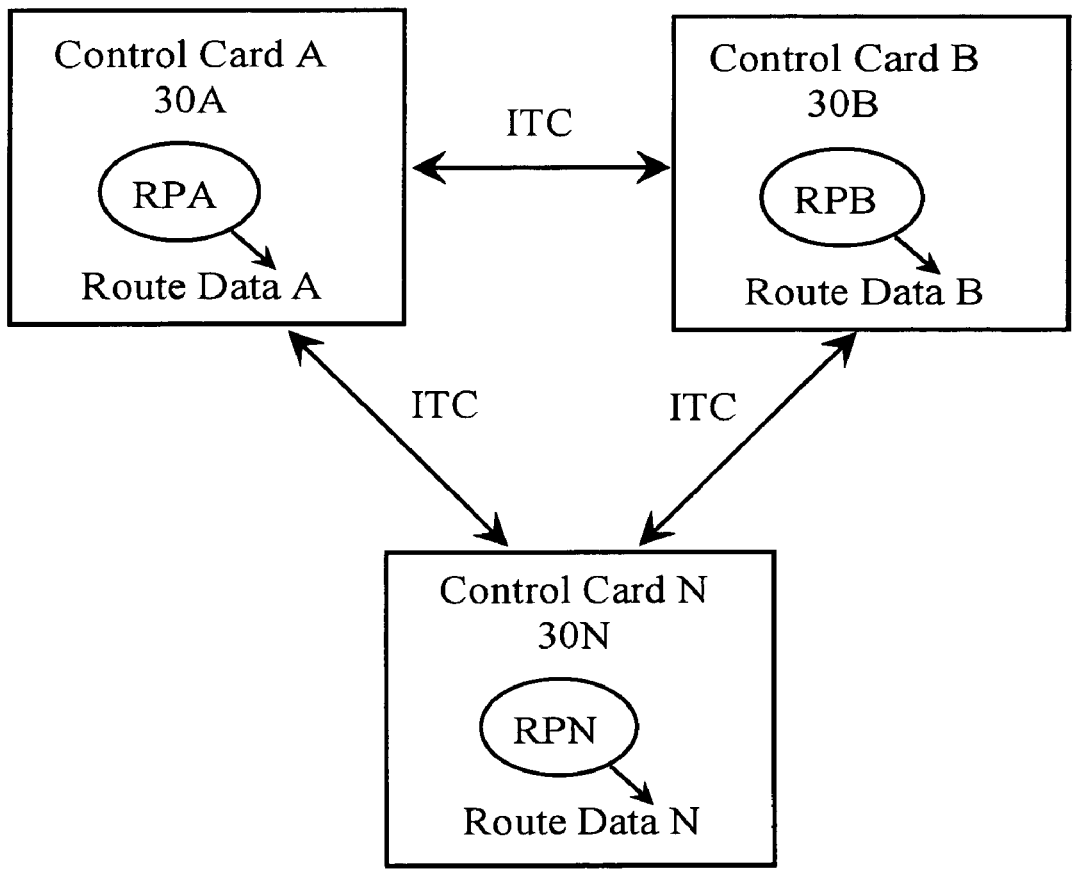
FIG. 2 schematically represents exchange of route data generated by different routing protocols, according to an embodiment of the invention.

FIG. 2 schematically represents exchange of route data, generated by different routing protocols, between a plurality of control cards 30A, 30B, and 30N within a distributed processor, scalable router, according to one embodiment of the invention. As alluded to hereinabove, the inventors have determined that superior performance from a scalable router is attained when routing protocols are distributed among control cards of the router. That is, superior performance is attained by running a plurality of different routing protocols on a plurality of processors within the control plane (on control cards) within the router. According to one embodiment, each of the plurality of processors is situated on a different control card of the router. With reference to FIG. 2, the plurality of control cards is represented by control cards 30A, 30B, and 30N. In the example shown in FIG. 2 a service or routing protocol task runs on each control card 30A, 30B, 30N. Therefore, according to the definitions presented hereinabove, a Level-1 task (L1) of the RTM is running on each processor. In particular, according to the example shown in FIG. 2, control cards 30A, 30B, 30N run routing protocol A, routing protocol B, and routing protocol N, respectively. Routing protocol A, routing protocol B, and routing protocol N, provide route data A, route data B, and route data N, respectively. As described hereinabove, the L1 for each control card requires route data from the full complement of routing protocols running on the plurality of control cards 30A, 30B, and 30N. L1s therefore exchange route data by registering with other L1s on a per-service basis.

Figure 3:
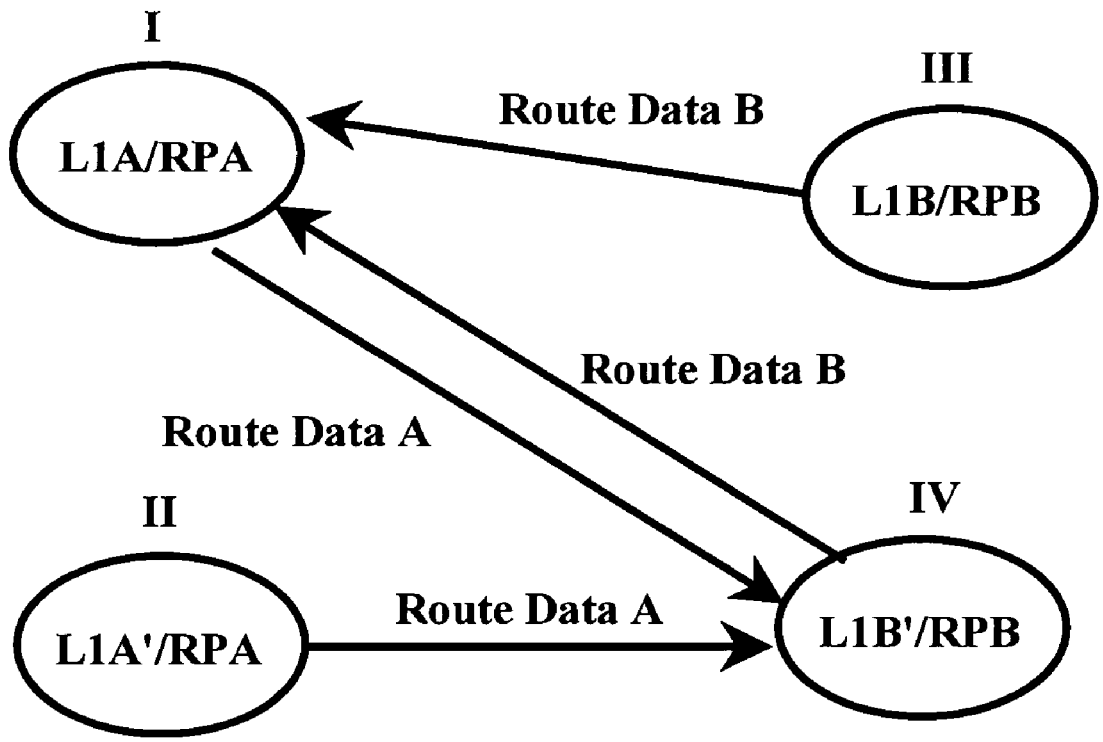
FIG. 3 schematically represents exchange of route data generated by two different routing protocols showing four servers and two clients, according to an embodiment of the invention.

FIG. 3 schematically represents exchange of route data generated by two different routing protocols showing four servers and two clients, according to an embodiment of the invention. This aspect of the instant invention relates to the registration of L1s with at least one other L1, on a per-service basis, for the facile exchange of non-locally generated route data. Each entity I–IV represents an L1 task: L1A, L1A', L1B, and L1B', respectively. For the purpose of this example, the routing protocol tasks are designated as routing protocol A (RPA) in the case of L1A and L1A', and routing protocol B (RPB) in the case of L1B and L1B'. Under the control of the RTM, L1A registers as a client with both L1B and L1B' for information generated by routing protocol B, wherein both L1B and L1B' are servers. Similarly, L1B' registers as a client with both L1A and L1A' for information generated by routing protocol A, wherein both L1A and L1A' are servers. Thus, the same entity may have both client and server functionality concurrently. For the sake of clarity, L1A' and L1B are not shown as clients, but as servers only, therefore sending, rather than receiving information.

In the arrangement shown in FIG. 3 L1A is registered with both L1B and L1B', which both run RPB, and L1B' is registered with both L1A and L1A', which both run RPA. This redundancy in preferred embodiments of the invention provides fault tolerance against the probability of failure of one or more L1 servers. Fault tolerance in the system is further described in a section below entitled Fault Tolerance.

Figure 4:
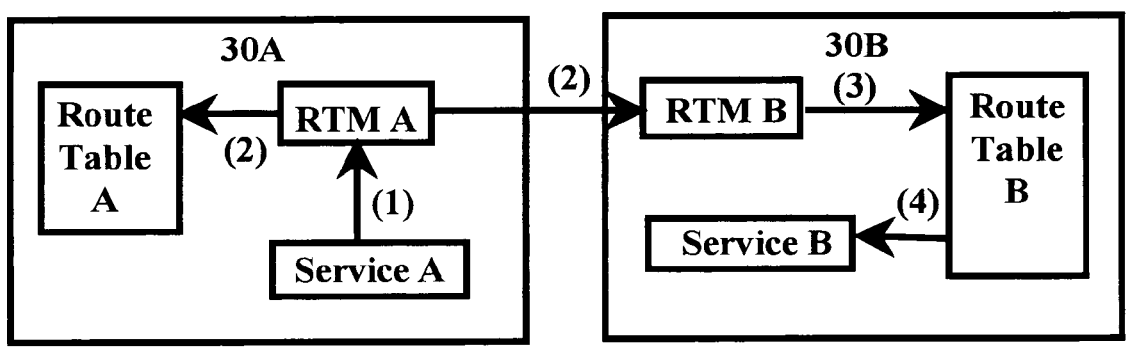
FIG. 4 schematically represents chronology of RTM-mediated data flow between two control cards, according to one embodiment of the invention FIG. 5 schematically represents a hierarchical relationship of RTM tasks according to a preferred embodiment of the invention.

FIG. 4 schematically represents the chronology of RTM-mediated data flow between control cards 30A and 30B of router 10, according to one embodiment of the invention. Only two control cards are depicted in FIG. 4, however it is to be understood that the principles of data flow could also apply to a larger number of control cards. Control cards 30A and 30B run services A and B, respectively. Each control card 30A and 30B also has an RTM task running, RTM A, RTM B, respectively. The fact of each of the processors running a service task dictates that RTM A and RTM B are both Level-1 as defined hereinabove. Data flow is initiated by information injection from service A to RTM A, as indicated by arrow 1. From RTM A, information is distributed concurrently to both route table A and to RTM B, as indicated by the two arrows each labeled 2. Thereafter, information is distributed from RTM B to route table B, as indicated by arrow 3. Finally, information is received by Service B from route table B, arrow 4. Data flow of the type illustrated in FIG. 4 enables the timely distribution of routing database updates between a plurality of control cards within a distributed processor router, in which the plurality of control cards are jointly responsible for running a plurality of different services.

By registration among L1s in the manner described herein, information generated by the full complement of services of the system can be effectively exchanged between L1s, with the result that each L1 maintains a synchronized routing database. Scalability of the distribution of database information among L1s is achieved by the formation of distribution trees during the registration process.

According to the invention, each L1 task will maintain a synchronized copy of the routing database. Each L1 task has the role of constructing a synchronized forwarding table for use by L2 tasks, wherein the forwarding table consists of a subset of the routing database. Specifically, the routing database consists of all route entries, both best and non-best as defined above, as well as interface information. Each L1 is able to construct the forwarding table, based on the routing database, by identifying the best route for each destination prefix.

In this manner, when a best route is deleted from the routing database, each L1 can immediately replace the deleted "best route" with the next best route in the forwarding table which matches the particular destination prefix.

An L2 task is an RTM task which is running on a processor outside of the L1 pool. Each L2 requires a copy of the forwarding table. The source for forwarding table information are L1 tasks that are running throughout the system.

Figure 5:
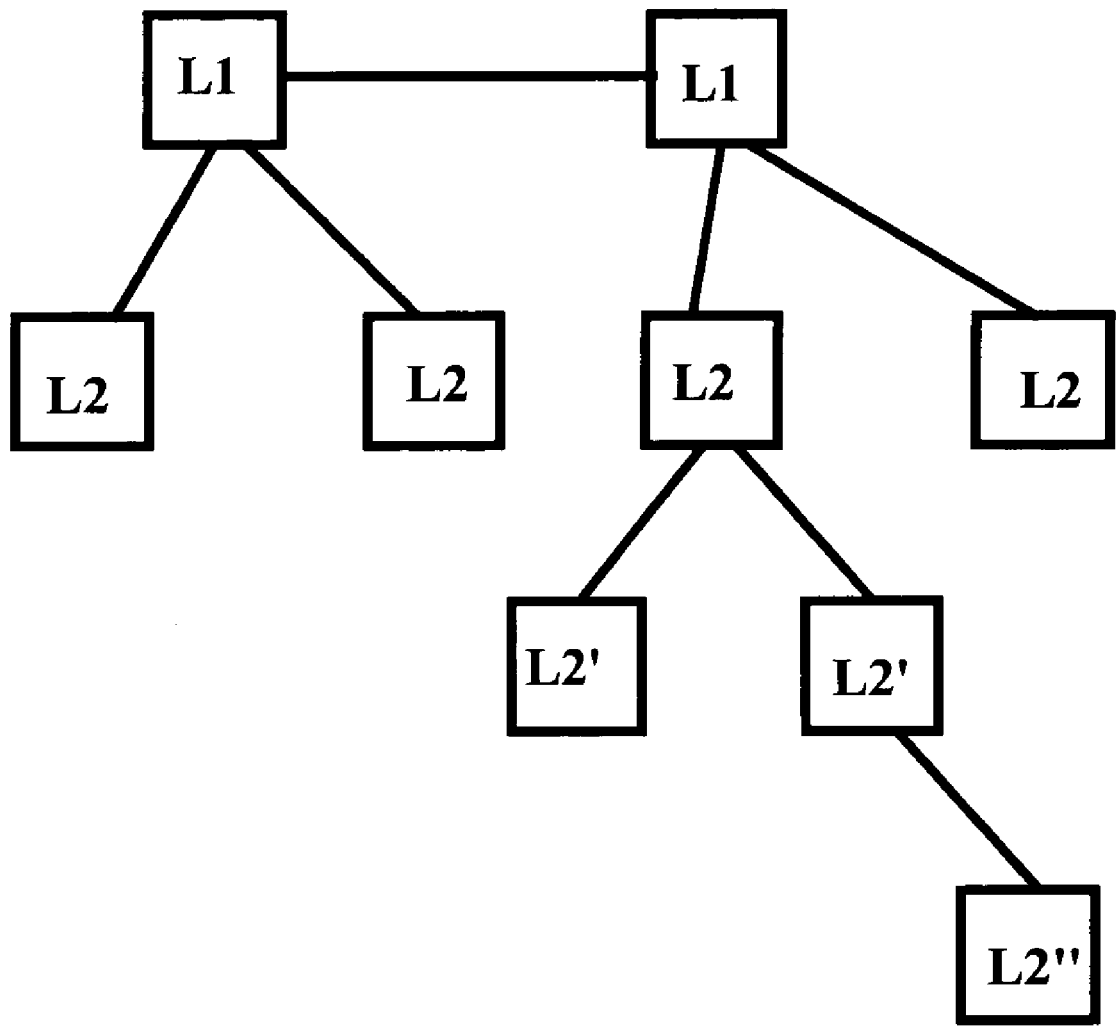

The hierarchical relationship of RTM tasks, according to a preferred embodiment of the invention, is schematically represented in FIG. 5. L1s represent the highest level, or top layer, of the hierarchical relationship. As described above, L1s are Level-1 RTM tasks which maintain a synchronized copy of the routing database and are the source of the forwarding table, whereas L2s are Level-2 RTM tasks which only maintain a copy of the forwarding table. L2s themselves can occupy different hierarchical levels. In order to distinguish between L2s which occupy different hierarchical levels, L2 nodes which are clients of L1 servers as well as servers of L2 clients may be designated L2's; while L2s which are clients of L2' nodes may be designated L2"s. Thus, immediately below the L1s, at the intermediate hierarchical level or layer, lie L2s that are registered with L1s for forwarding table information. Below the intermediate hierarchical level lie L2's which are registered with an L2 node. Further, L2"s may be registered with L2's. According to a preferred embodiment, the depth of the topology shown in FIG. 5 is kept low by having a large fan-out at Layer 1. Again with reference to FIG. 5, it should be noted that although only a single server is shown for each client, according to a currently preferred embodiment of the invention designed for fault tolerance, i.e. tolerance of the router system to failure of a RTM task server, each client has at least two servers. In practice, for a given L2" client (Layer 4), one server can be a Layer 1 server (L1), and the other can be a Layer 2 node.

According to the invention, communication between RTM task clients and RTM task servers takes place to form scalable and fault tolerant distribution topologies. Among L1 tasks, distribution trees are formed for the propagation of routing database information. An L1 task which is running in association with a given service has the role of sourcing routing database information generated by that service. Distinct distribution trees therefore exist per service for the exchange of routing database information among L1 tasks. In a similar manner, distribution trees for the propagation of the forwarding table are formed with L1 tasks as the source of forwarding table information and L2 tasks as the nodes and leaves.

The RTM interacts with a Location Service module to determine the location of all RTM tasks running within router system 10. That is, the Location Service (LS) functions as a directory service. Interactions of the RTM with the LS include: (1) L1 RTM tasks, running on a control card 30, query the LS to determine the location of any RTM tasks acting as the source of routing database information for a particular service; (2) L2 RTM tasks query the LS to determine the location of any L1 RTM tasks (sources of forwarding table information); (3) LS notifies the RTM in the event that an RTM task comes up or goes down and (4) RTM tasks provide LS with RTM task type (including the routing database source) and level information to answer queries described in (1) through (3).

Figure 6:
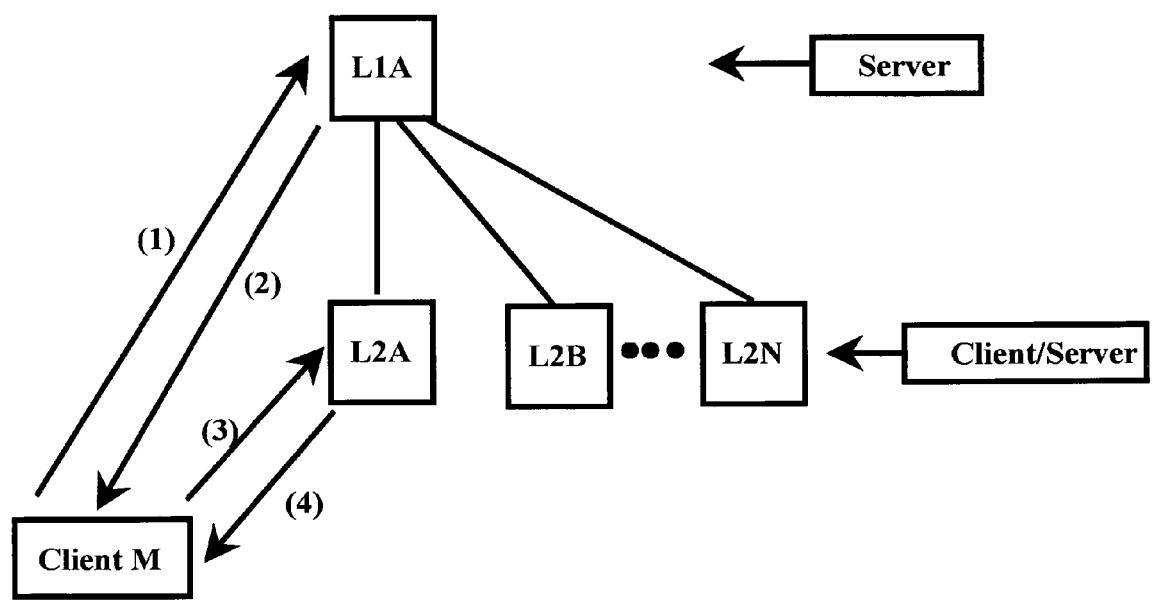
FIG. 6 schematically represents a hierarchical relationship between route table manager tasks, according to one embodiment of the invention.

As described above, L1s are responsible for propagating the forwarding database to the Level-2 tasks (L2s). This is accomplished by the establishment of L1–L2 client-server relationships. L2 nodes register with L1s for the forwarding table only (i.e., L2 nodes register for the forwarding table "service"). According to one aspect of the invention, an L1 server will accept N L2 clients, where N is determined, at least in part, by the configured maximum fan-out. This situation is schematically represented in FIG. 6, in which an L1 server (L1A) already has N L2 clients, represented by L2A, L2B, and up to L2N. Client M represents an L2 that is not a client of an RTM task running in the control plane of the router system. If client M then signals a request to register with L1A (arrow 1), that request is denied as represented by arrow 2. If maximum fan-out has been reached on all L1s in the control plane, client M then requests registration (arrow 3) with an L2, e.g. L2A, that is a client of an L1 (in this case L1A). A registration response message is then sent from L2A to client M, as represented by arrow 4. Client M can now receive forwarding table updates from L1A via L2A. Maximum fan-out in L1–L2 client-server relationships is determined, inter alia, by CPU load. In case maximum fan-out of all L2 servers has been reached, then a client can force registration. This client-server registration procedure is used to form distribution trees for the propagation of the forwarding database among all L2 clients. Information on the location of the servers is available from the LS. According to a currently preferred embodiment, the LS itself runs on all control cards 30 and line cards 40 of router system 10.

It will be apparent to the skilled artisan that the client-server registration procedure described here is hierarchically based, in that L2s first attempt to register with L1s until maximum fan-out has been reached, and only then will an L2 attempt to register with an L2 that is registered as a client of an L1. An L2 which acts as a server to an L2 client may be designated L2', and an L2 client of an L2' server may be designated L2" (FIG. 5). Large scale distribution is therefore achieved by using a reliable multicast transmission at the tree nodes. In general, the number of L2s is greater than the number of L1s. According to one embodiment, the ratio of L1s to L2s ranges from about 1:1 to about 1:15.

Fault Tolerance

Fault tolerance in the system of the invention, as alluded to briefly above, is achieved by redundancy in registration, and therefore in communication. As a client, an L1 or L2 task registers with at least two servers from which it may receive the same information. One of the servers with which the client registers is considered a primary server, and the other a secondary. The client communicates exclusively with the primary unless and until the primary fails in some manner to deliver, and then the client turns to the secondary for database updates. Service is thus uninterrupted.

In the event of a server failure, and a necessary switchover by a client to its secondary server, the client receives a copy of the secondary server's database. If the client is a node in a distribution tree, it simply delivers to its clients the difference between the existing database and the copy of the database received from the secondary server.

Figure 7A:
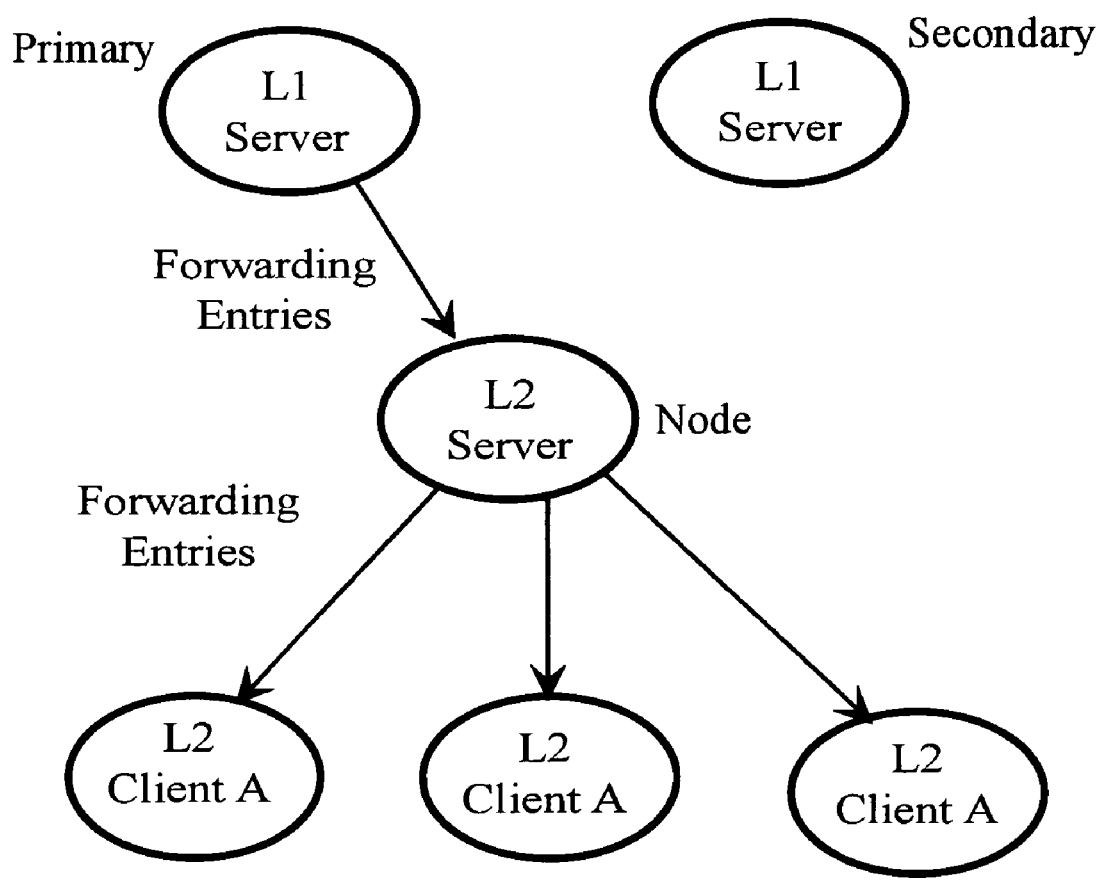
FIG. 7A schematically represents the distribution of route data from a route table manager Level-1 task primary server to a route table manager Level-2 task client, according to the invention.

Referring now to FIG. 7A, the role of a control card as a Level-2 node is to receive forwarding entries from its primary L1 server, and then to redistribute the forwarding entries to its own clients, represented as L2 clients A, B, and C. The L2 node is registered with two L1 servers, the primary L1 server and the secondary L1 server, for the purpose of fault tolerance, as schematically represented in FIG. 7A.

Figure 7B:
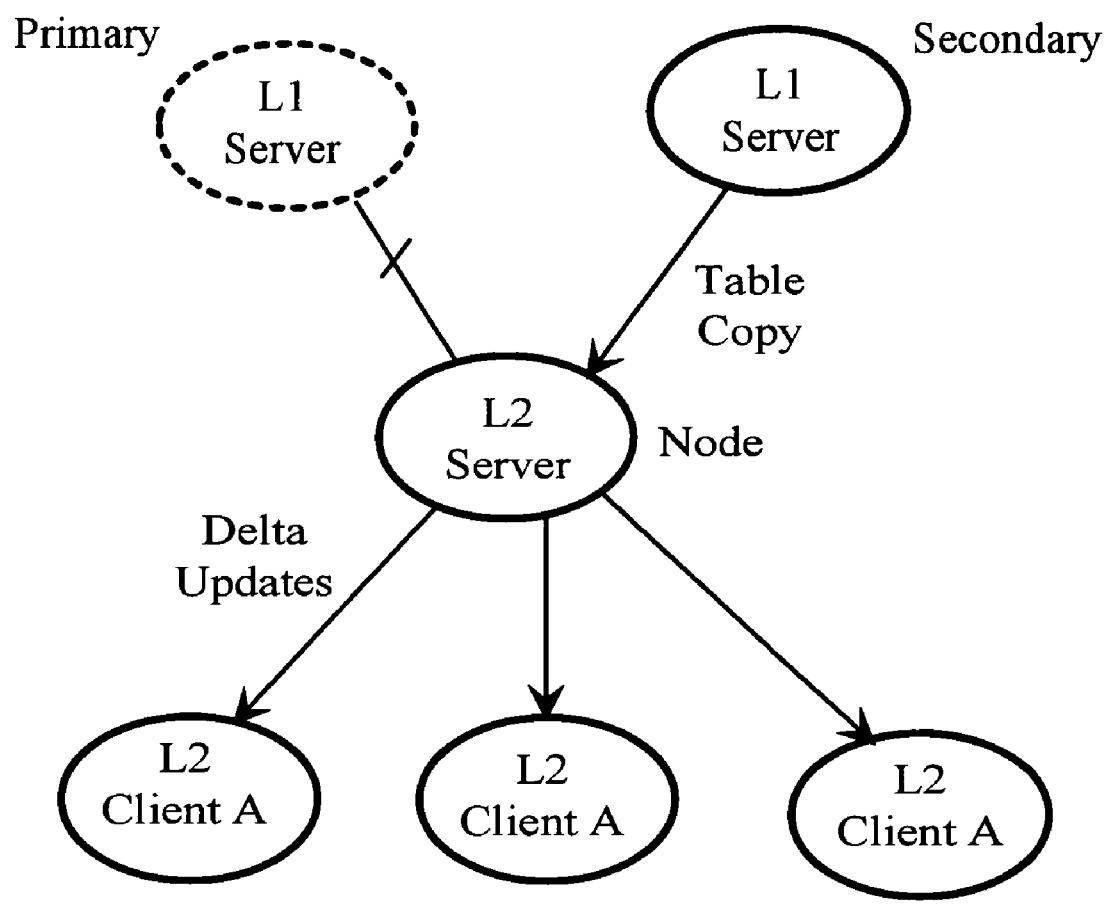
FIG. 7B schematically represents the distribution of route data from a route table manager Level-1 task secondary server to a route table manager Level-2 task client, according to an embodiment of the invention.

Referring now to FIG. 7B, if the primary L1 server fails, the L2 node activates its secondary L1 server. When the secondary L1 server is activated, it delivers a complete copy of its database to the L2 node, as schematically represented in FIG. 7B. When the L2 node receives the copy of the entire table from the secondary L1 server, it compares that copy to its existing database, and calculates the difference between the two. It only needs to distribute to L2 clients A, B and C the difference between the entire new table and its existing table.

Figure 8:
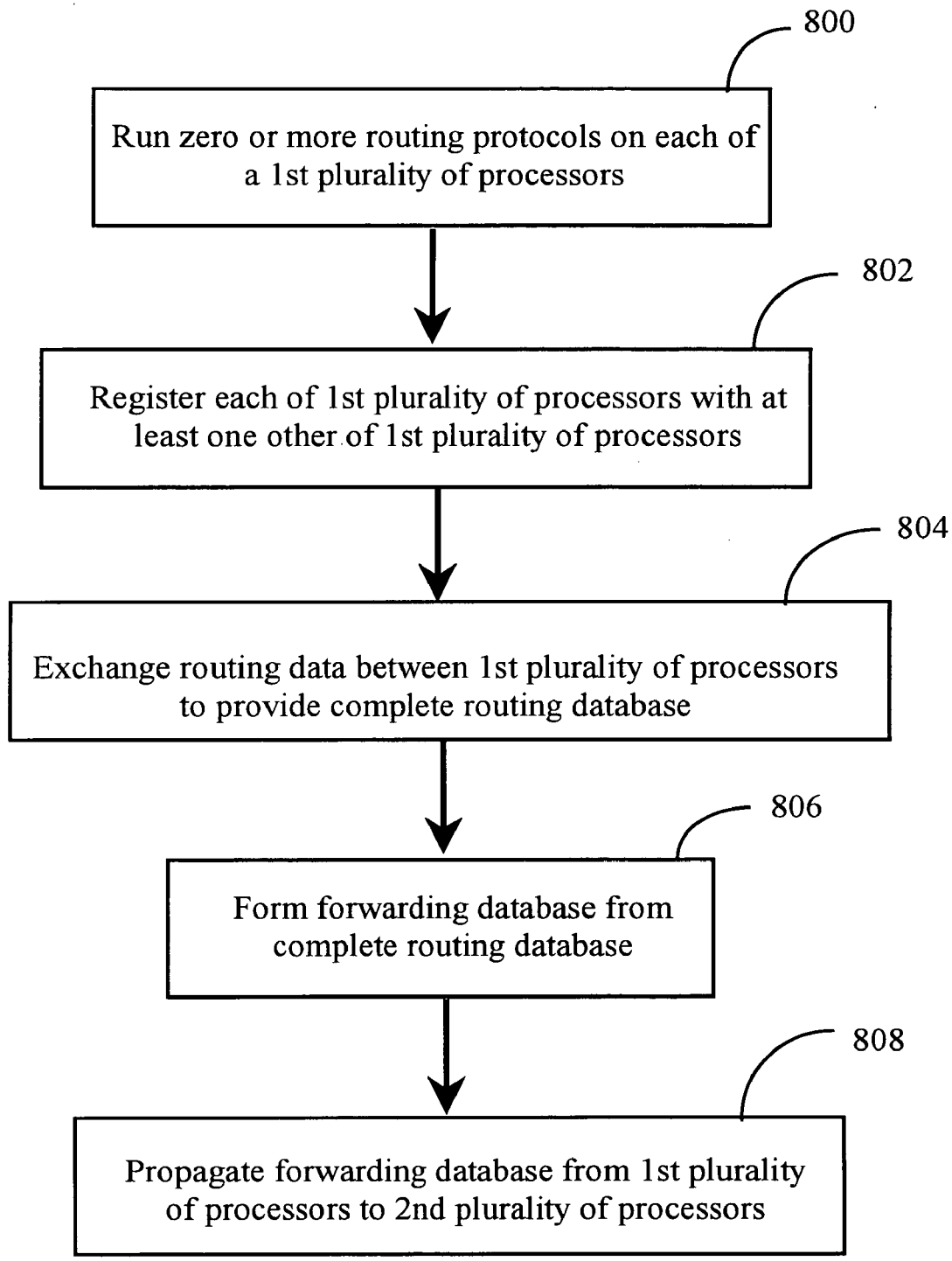
FIG. 8 schematically represents a series of steps involved in a method for synchronized distribution of routing data within a distributed processor router, according to another embodiment of the invention.

FIG. 8 schematically represents a series of steps in a method for the synchronized distribution of routing data within a distributed processor, highly-scalable router, according to one embodiment of the invention. Step 800 of FIG. 8 involves running at least one routing protocol of a complement of routing protocols on individual ones of a first plurality of processors, wherein each routing protocol of the complement of routing protocols generates routing data. This first plurality of processors are the L1 processors described in detail above. Also as previously described, it is the configuration of the L1s to run routing protocols and to otherwise behave as L1s that makes them L1s. An L1 may not be running a routing protocol, but still be an L1. That is, an L1 may obtain all of its routing data from other L1s with which it registers as a client.

Step 802 involves registering each of the first plurality of processors with at least one other of the first plurality of processors. Step 804 involves exchanging the routing data between members of the first plurality of processors, such that each of the first plurality of processors receives a full complement of routing data generated by the complement of routing protocols. The complement of routing data received by each of the first plurality of processors provides a complete routing database. Step 806 involves forming a forwarding database from the complete routing database provided as a result of step 804. The forwarding database formed in step 806 is comprised of a subset of the complete routing database provided in step 804.

Step 808 involves propagating the forwarding database from the first plurality of processors to a second plurality of processors of the distributed processor router, wherein the second plurality of processors are characterized as not running (or being configured to run) routing protocols.

The method steps 800 through 808 may be sequentially repeated over time, for example, when updated reachability information is received from one or more peer routers of the distributed processor router.

GENERAL APPLICABILITY

The embodiments of the present invention described in enabling detail above have all been related to routing of data packets in multi-processor, scalable routers. These embodiments are exemplary, and represent a preferred application of the new technology described, but are not limiting in applicability of the invention. There are numerous other situations and systems in which the apparatus and methods of the invention may provide advantages. These situations include all situations in which multiple processors may be employed in parallel processing applications, wherein maintenance of one or more common databases is the object. The description of the present invention is intended to be illustrative, and not to limit the scope of the appended claims. Many alternatives, modifications, and variations will be apparent to those skilled in the art.

What is claimed is:

1. In distributed processor system wherein a first and second protocol operating on individual ones of a first plurality of processors operating within a single data packet router are involved in independently generating or amending data for a routing database, and wherein each of the first of plurality of processors maintains a copy of the database, a method for synchronized maintenance and distribution of the routing database, comprising the steps of:

(a) running the first or the second protocol on each of the first plurality of processors, wherein each of the first plurality of processors independently generates or amends data for the routing database;

(b) registering each of the first plurality of processors with at least one other of the first plurality of processors, creating first client-server pairs operating within the single data packet router between said each of the first plurality of processors and said at least one other of the first plurality of processors, in an arrangement that each of the first plurality of processors either runs or registers with a processor running both the first and second protocols, (c) sharing the generated or amended data for the routing database from first servers to first registered clients of the first client-server pairs, such that each of the first plurality of processors receives generated or amended data for the routing database from both the first and second protocols.

2. The method of claim 1 wherein the system comprises a second plurality of processors upon which the first and second protocol do not run, and further comprising a step (d) for registering each of the second plurality of processors with at least one of the first plurality of processors, creating second client-server pairs between individual ones of the first and second plurality of processors, and a step (e) for sharing at least a subset of the routing database from second servers to second clients of the second client-server pairs.

3. The method of claim 2 comprising a third plurality of processors upon which the first and second protocols do not run, and further comprising a step (f) for registering each of the third plurality of processors with individual ones of the second plurality of processors, creating client-server pairs between individual ones of the second and third plurality of processors, enabling clients in the third plurality of processors to receive copies of the subset of the routing database.

4. The method of claim 3 wherein, in one or more of steps (b), (d) and (f) clients register with a second processor to create a redundant server-client relationship for fault tolerance.

5. The method of claim 4 wherein a client treats two servers with which it registers as a primary and a secondary server, and communicates only with the primary server as long as the primary server remains capable of communication, and further comprising a step for activating the secondary server in the event the primary server fails.

6. The method of claim 5 wherein, upon activation of the secondary server, a copy of the routing database is sent to client, which compares that copy with its own copy, determines a difference, and uses only the difference in further propagation of copies.

7. A distributed processor system comprising:
a first plurality of processors, each processor maintaining a copy of a routing database; and
first and second protocols operating on individual ones of the first plurality of processors, the first and the second protocols independently generating or amending data for the routing database;
characterized in that each of the first plurality of processors registers with at least one other of the first plurality of processors, creating first client-server pairs between said each of the first plurality of processors and said at least one other of the first plurality of processors, operating within the single data packet router, in an arrangement that each of the first plurality of processors either runs or is registered with a processor running both the first and second protocols, and first servers of the first client-server pairs share the generated or amended data for the routing database with first registered clients of the first client-server pairs, such that each of the first plurality of processors receives generated or amended data for the routing database from both the first and second protocols.

8. The system of claim 7 comprising a second plurality of processors upon which the first and second protocol do not run, wherein each of the second plurality of processors registers with at least one of the first plurality of processors, creating second client-server pairs between individual ones of the first and second plurality of processors, and at least a subset of the routing database is shared from the first servers in the first plurality of processors to second clients in the second plurality of processors.

9. The system of claim 8 comprising a third plurality of processors upon which the first and second protocols do not run, wherein each of the third plurality of processors register with individual ones of the second plurality of processors, creating third client-server pairs between individual ones of the second and third plurality of processors, enabling clients in the third plurality of processors to receive copies of the subset of the routing database.

10. The system of claim 9 wherein third clients register with an additional processor to create a redundant server-client relationship for fault tolerance.

11. The system of claim 10 wherein a client treats the two servers with which it registers as a primary and a secondary server, communicates only with the primary server as long as the primary server remains capable of communication, and activates the secondary server in the event the primary server fails.

12. The system of claim 11 wherein, upon activation of the secondary server, a copy of the routing database is sent to the client processor, which compares that copy with its own copy, determines a difference, and uses only the difference in further propagation of copies.

13. In a single data packet router wherein first and second routing protocols generating routing data operate on individual ones of a first plurality of processors, and wherein each of the first plurality of processors maintains a copy of a routing table, a method for synchronized maintenance and distribution of the routing table and a forwarding table subset of the routing table, comprising the steps of:
(a) running the first or the second routing protocol on each of the first plurality of processors, wherein each of the first plurality of processors independently generates the routing data for the routing table;

(b) registering each of the first plurality of processors with at least one other of the first plurality of processors, creating first client-server pairs between said each of the first plurality of processors and said at least one other of the first plurality of processors, operating within the single data packet router, in an arrangement that each of the plurality of processors either runs or is registered with a processor running both the first and second routing protocols; and
(c) sharing the routing data from first servers of the first client-server pairs to registered clients of the first client-server pairs, such that each of the first plurality of processors receives the routing data from both the first and second routing protocols.

14. The method of claim 13 wherein the data packet router comprises a second plurality of processors upon which the first and second routing protocols do not run, and further comprising a step (d) for registering each of the second plurality of processors with at least one of the first plurality of processors, creating second client-server pairs between individual ones of the first and second plurality of processors, and a step (e) for sharing a forwarding table subset of the routing table from the first servers in the first plurality of processors to second clients in the second plurality of processors.

15. The method of claim 14 comprising a third plurality of processors upon which the first and second routing protocols do not run, and further comprising a step (f) for registering each of the third plurality of processors with individual ones of the second plurality of processors, creating third client-server pairs between individual ones of the second and third plurality of processors, enabling clients in the third plurality of processors to receive copies of the forwarding table.

16. The method of claim 15 wherein, in one or more of steps (b), (d) and (f) clients register with an additional processor to create a redundant server-client relationship for fault tolerance.

17. The method of claim 16 wherein a client treats the two servers with which it registers as a primary and a secondary server, and communicates only with the primary server as long as the primary server remains capable of communication, and further comprising a step for activating the secondary server in the event the primary server fails.

18. The method of claim 17 wherein, upon activation of the secondary server, a copy of the routing table or forwarding table is sent to client, which compares that copy with its own copy, determines a difference, and uses only the difference in further propagation of copies.

19. A data packet router comprising:
a first plurality of processors, each maintaining a copy of a routing table; and
first and second protocols operating on individual ones of the first plurality of processors, the protocols independently generating or amending routing data for the routing table;
characterized in that each of the first plurality of processors registers with at least one other of the first plurality of processors, creating first client-server pairs between said each of the first plurality of processors and said at least one other of the first plurality of processors operating within a single data packet router, in an arrangement that each of the plurality of processors either runs or is registered with a processor running both the first and second protocols, and first servers of the first client-server pairs share the generated or amended routing data with first clients of the first client-server pairs, such that each of the first plurality of processors receives generated or amended routing data from both the first and second protocols.

20. The router of claim 19 comprising a second plurality of processors upon which the first and second protocols do not run, wherein each of the second plurality of processors registers with at least one of the first plurality of processors, creating second client-server pairs between individual ones of the first and second plurality of processors, and at least a forwarding table subset of the routing table is shared from the first servers in the first plurality of processors to second clients in the second plurality of processors.

21. The router of claim 20 comprising a third plurality of processors upon which the first and second protocols do not run, wherein each of the third plurality of processors register with individual ones of the second plurality of processors, creating third client-server pairs between individual ones of the second and third plurality of processors, enabling clients in the third plurality of processors to receive copies of the forwarding table subset of the routing table.

22. The router of claim 20 wherein clients register with an additional processor to create a redundant server-client relationship for fault tolerance.

23. The router of claim 22 wherein a client treats two servers with which it registers as a primary and a secondary server, communicates only with the primary server as long as the primary server remains capable of communication, and activates the secondary server in the event the primary server fails.

24. The router of claim 23 wherein, upon activation of the secondary server, a copy of the routing or forwarding table is sent to third client, which compares that copy with its own copy, determines a difference, and uses only the difference in further propagation of copies.

* * * * *